UNITED STATES PATENT OFFICE.

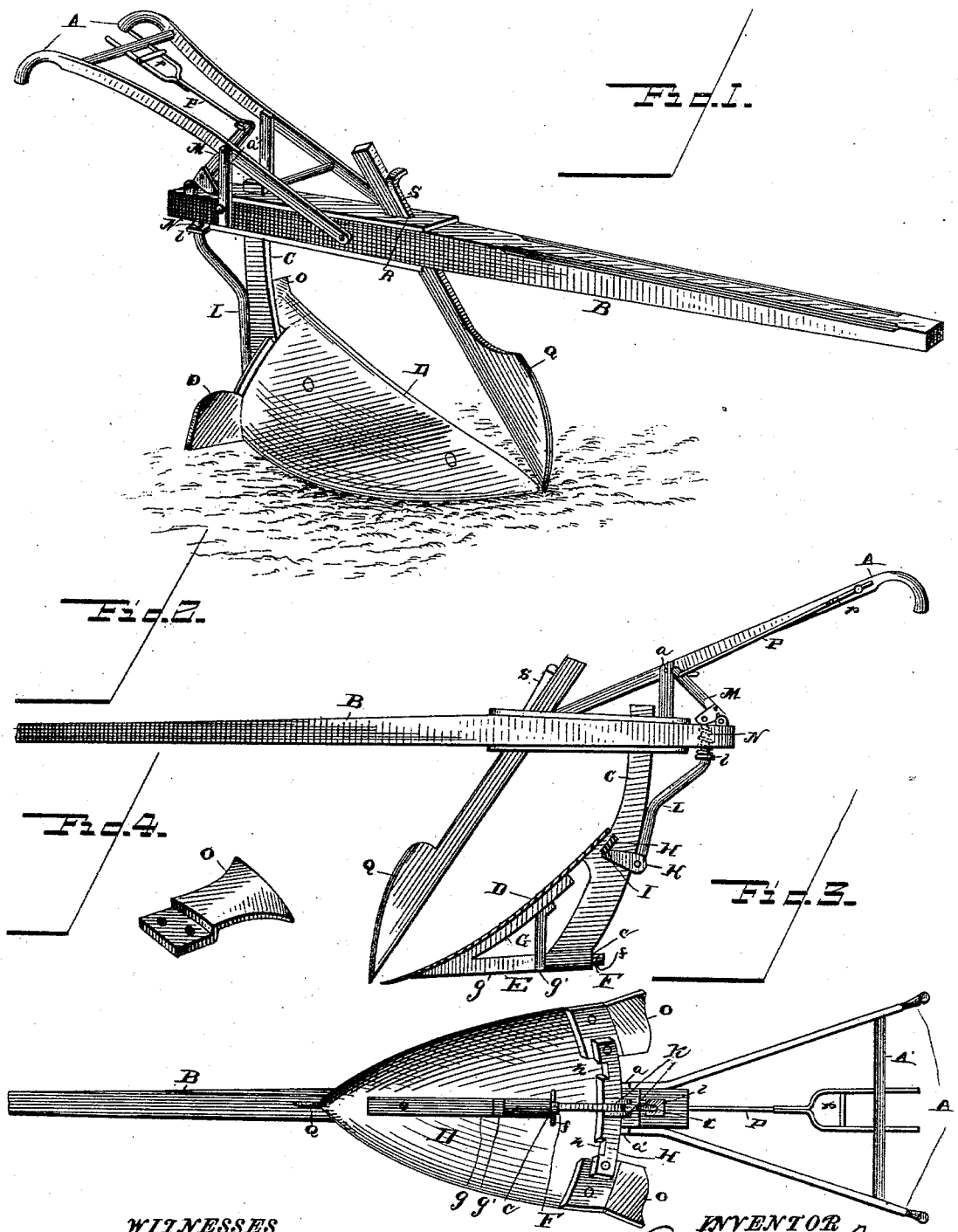

CHARLES C. GREGORY, OF PEAK'S MILL, KENTUCKY.

PLOW.

SPECIFICATION forming part of Letters Patent No. 414,701, dated November 12, 1889.

Application filed April 17, 1889. Serial No. 307,594. (No model.)

*To all whom it may concern:*

Be it known that I, CHARLES C. GREGORY, a citizen of the United States, residing at Peak's Mill, in the county of Franklin and State of Kentucky, have invented certain new and useful Improvements in Plows; and I do hereby declare that the following is a full, clear, and exact description of the invention, which will enable others skilled in the art to which it appertains to make and use the same.

The invention relates to improvements in plows of the class having adjustable or swinging mold-boards; and it has for its object to provide simple, effective, and durable means whereby the mold-board may be arranged centrally or on either side, to suit the kind of work which it is intended to perform.

The invention consists in a certain novel construction and combination of devices, fully described hereinafter in connection with the drawings, and pointed out in the claims.

In the drawings, Figure 1 is a perspective view of a plow embodying my improvements. Fig. 2 is a side view, partly in section. Fig. 3 is a bottom plan view showing the mold-board adjusted centrally. Fig. 4 is a detail view of one of the wings detached.

The handles A of the improved plow are bolted to the draft-beam B, near its rear end, and are supported by the short braces *a a;* and the plow-standard C is affixed to the rear end of the beam, comes forwardly toward its lower end, and terminates in a horizontal or slightly-inclined eye or bearing *c.*

The mold-board D, which is tapered equally on both sides toward its front end or point, or otherwise, as may be desired, is provided on its under side with a bracket E, having a rearwardly-projecting or slightly-elevated horizontal spindle F, which is mounted in the eye or bearing *c,* and is held therein by means of a pin *f,* or tap. This bracket consists of an upwardly-concaved upper arm G, which is bolted directly to the under surface of the mold-board at its center, and a horizontal or elevated lower arm *g,* which is connected at its free end to the upper arm by a vertical brace *g'.* The lower arm of the bracket is extended to form the spindle F. The mold-board is curved in cross-section, so as to have a concave under side; and to the curved upper edge (on the under side) is attached a notched or rack bar H, which is separated slightly from the surface of the mold-board and fits and slides in a guide-opening I in the standard. A pawl K is pivoted or bolted to the standard and extends under the said guide-opening to engage the notches *h* in the rack-bar, and the rear free end of this pawl is connected by a link or rod L to the shorter arm of an angle-lever M, which is pivoted on the upper side of the draft-beam between the handles. The pawl preferably comprises the separate arms *k k,* which are pivoted or bolted, respectively, on opposite sides of the standard, and the lower end of the connecting link or rod is pivoted between the rear ends of the said arms. The connecting rod or link preferably passes through a vertical perforation in the beam, and is provided below the same with a shoulder *l,* against which the lower end of a coiled spring N (which is located in the said perforation) presses, to hold the pawl normally in engagement with the rack-bar.

The rearwardly-extending wings O O, which are bolted to the under side of the mold-board at its rear end, are curved downwardly at their outer and upwardly at their inner corners to properly roll the soil, and these wings are removable, to enable them to be taken off when desired.

An operating-rod P is connected to the free end of the long arm of the angle-lever, and is guided at its rear end in perforations in the round A' of the handle. This rod is provided with a handle *p,* to enable it to be drawn rearwardly by a hand grasping the round.

The colter Q, the point of which is arranged slightly in advance of the point of the mold-board, is fitted at its upper end in an aperture R in the beam, and is held therein by the wedge S. The spindle of the mold-board is substantially in the same horizontal or elevated plane with the point thereof, whereby when said mold-board is swung from side to side its point remains in the same place.

To adjust the position of the mold-board, disengage the pawl and swing the rear end of the former in either direction until the proper inclination is reached, and then release the pawl, when it will re-engage the rack-bar.

I claim—

1. In a plow, the combination, with a standard provided at its lower end with a horizontal or inclined bearing and with a transverse slot, of a reversible mold-board having its spindle mounted in said bearing and provided with a transverse bar near its upper end adapted to slide in said slot and support the upper end of the mold-board, substantially as set forth.

2. In a plow, the combination, with a standard, of the mold-board pivoted at the center of the width on the standard and provided with a rack-bar, which operates in a guide-opening in the standard, the pawl engaging said rack-bar, and the angle-lever having one arm connected to the pawl and the other arm connected to an operating-rod, substantially as set forth.

3. The herein-described plow, comprising a standard, a reversible mold-board pivoted thereto and provided with removable wings and with a rack-bar movable in a guide-opening in the standard, the pawl engaging said rack-bar, an operating-rod, and an angle-lever connected with the latter and the pawl, all arranged and adapted to operate substantially as and for the purpose set forth.

In testimony whereof I affix my signature in presence of two witnesses.

CHARLES C. GREGORY.

Witnesses:
MACK SALYERS,
J. C. VINE.